United States Patent
Andriessen

(10) Patent No.: US 6,911,081 B2
(45) Date of Patent: Jun. 28, 2005

(54) PREPARATION OF METAL CHALCOGENIDE DISPERSIONS

(75) Inventor: Hieronymus Andriessen, Beerse (BE)

(73) Assignee: Agfa-Gevaert N.V., Mortsel (BE)

( * ) Notice: Subject to any disclaimer, the term of this patent is extended or adjusted under 35 U.S.C. 154(b) by 307 days.

(21) Appl. No.: 10/053,104

(22) Filed: Jan. 24, 2002

(65) Prior Publication Data

US 2002/0144646 A1 Oct. 10, 2002

Related U.S. Application Data

(60) Provisional application No. 60/271,004, filed on Feb. 23, 2001.

(30) Foreign Application Priority Data

Feb. 7, 2001 (EP) .............................. 01000010

(51) Int. Cl.$^7$ ................................. C30B 7/04
(52) U.S. Cl. .................... 117/68; 977/DIG. 1
(58) Field of Search ............... 117/68, 73, 75, 117/956; 977/DIG. 1

(56) References Cited

U.S. PATENT DOCUMENTS

| | | | | |
|---|---|---|---|---|
| 5,879,715 A | * | 3/1999 | Higgins et al. | ............. 424/489 |
| 6,179,912 B1 | * | 1/2001 | Barbera-Guillem et al. | .. 117/68 |
| 6,241,819 B1 | * | 6/2001 | Bhargava et al. | ............. 117/68 |

FOREIGN PATENT DOCUMENTS

| | | | |
|---|---|---|---|
| EP | 0622439 A1 | * 2/1994 | ........... C09K/11/00 |
| EP | 0 622 439 | 11/1994 | |
| WO | 00/46839 | 8/2000 | |
| WO | WO 00/46839 | * 10/2000 | |

OTHER PUBLICATIONS

European Search Report, Application No. 01 00 0010, Jun. 21, 2001.
Database Inspec 'Online!, Institute of Electrical Engineers, Stevenage, GB; Vacassy R et al.:"Nanostructured zinc sulfide phosphors" Database accession No. 6208568, XP002170204, Abstract.
Database Inspec 'Online!, Institute of Electrical Engineers, Stevenage, GB; Rogach A et al.:"Synthesis and characterization of a size series of extremely small thiol–stabilized CdSe noncrystals" Database accession No. 6302456, XP002170205.

* cited by examiner

*Primary Examiner*—Nadine G. Norton
*Assistant Examiner*—Matthew A. Anderson
(74) *Attorney, Agent, or Firm*—Joseph T. Guy; Nexsen Pruet, LLC.

(57) ABSTRACT

Optionally doped nanoparticle dispersions of metal chalcogenides are prepared by a precipitation step in aqueous medium, followed by a diafiltration or ultrafiltration step in the presence of a compound capable of preventing agglomeration of said metal chalcogenide nanoparticles.

26 Claims, No Drawings

PREPARATION OF METAL CHALCOGENIDE DISPERSIONS

This application claims the benefit of Provisional application Ser. No. 60/271,004, filed Feb. 23, 2001.

FIELD OF THE INVENTION

The present invention relates to an improved method for the preparation of nanoparticle dispersions containing optionally doped metal chalcogenides.

BACKGROUND OF THE INVENTION

There is a lot of recent scientific literature on metal chalcogenide nanoparticles with semiconductor properties. For instance, doped ZnS particles (ref. 1–9) can be used in eletroluminescent (EL) devices; CdS can be used in solar cells (ref. 10–14).

The precipitation of such metal chalcogenide nanoparticles can be performed homogeneously in water (ref. 1–6) or heterogeneously from micelles (ref. 7–9). After precipitation these particles are filtrated, washed and dried, after which their fotoluminescence or electroluminescence properties can be studied. The drawback of this method is that due to these filtration, wash and drying step the particles will inevitably tend to agglomerate. This is disadvantageous for their physico-chemical properties and possibly also for their luminescence properties. Centrifugation and flocculation show the same drawbacks.

With ZnS dispersion there is following additional problem: by hydrolysis/oxidation of the ZnS particle surface hydroxide-like gels arise which during concentration steps inevitably give rise to gelation and agglomeration In order to be able to coat functionally useful layers of nanoparticles (average particle size<100 nm) it is necessary to concentrate the coating dispersion sufficiently. By doing so it becomes possible to coat enough active compound per $m^2$ with conventional coating techniques. For example, for a coverage of 2 g Zn(Mn)S per $m^2$ and a wet coating thickness of 40 $\mu$m a concentration of 50 g Zn(Mn)S nanoparticles per liter is needed.

So there is a need for an improved method for washing and concentrating of precipitated metal chalcogenide particles without the occurence of agglomeration.

Ultrafiltration and diafiltration are well-known methods for washing and concentrating precipitated metal salts. However when applying this to ZnS gelation occurs and due to the increasing viscosity the ultrafiltration membrane will clog.

The use of surface-active compounds capable of stopping the growth of chalcogenides are known from literature. They are used to stop the growth of very fine nanoparicles with average size below 10 nm. Most commonly mentioned is thioglycerol (ref. 9, 13). However when using this compound during precipitation the growth of the particles is disturbed. In this case the particles remain so small that the dispersion cannot be ultrafiltrated.

References
(1) Eshuis A.; van Elderen G. R. A.; Koning C. A. J.; Colloids and Surfaces A: Physicochemical and Engineering Aspects (1999), 151, 505–512.
(2) Gallagher, D.; Heady, W. E.; Racz, J. M.; Bhargava, R. N.; J. Mater. Res. (1995), 10(4), 870–6.
(3) Murase, N.; Jagannathan, R.; Kanematsu, Y.; Watanabe, M.; Kurita, A.; Hirata, K.; Yazawa, T.; Kushida, T.; J. Phys. Chem. B (1999), 103(5), 754–760.
(4) Vacassy, Robert; Scholz, Stefan M.; Dutta, Joydeep; Plummer, Christopher John George; Houriet, Raymond; Hofmann, Heinrich; J. Am. Ceram. Soc. (1998), 81(10), 2699–2705.
(5) Yu, I.; Isobe T.; Senna M.; J. Phys. Chem. Solids (1996), 57(4), 373–379.
(6) Que, Wenxiu; Zhou, Y.; Lam, Y. L.; Chan, Y. C.; Kam, C. H.; Liu, B.; Gan, L. M.; Chew, C. H.; Xu, G. Q.; Chua, S. J.; Xu, S. J.; Mendis, F. V. C.; Appl. Phys. Lett. (1998), 73(19), 2727–2729.
(7) Xu, S. J.; Chua, S. J.; Liu, B.; Gan, L. M.; Chew, C. H.; Xu, G. Q. Appl. Phys. Lett. (1998), 73(4), 478–480.
(8) Gan, L. M.; Liu, B.; Chew, C. H.; Xu, S. J.; Chua, S. J.; Loy, G. L.; Xu, G. Q.; Langmuir (1997), 13(24), 6427–6431.
(9) Hao E.; Sun Y.; Yang B.; Zhang X.; Liu J.; Shen J.; J. of Coll. and Int. Sc. (1998), 204, 369–373.
(10) Sugimoto T.; Chen S.; Muramatsu A.; Coll. Surf. A: Phys. Eng. Aspects (1998), 135, 207–226.
(11) Vossmeyer T.; Katsikas L.; Giersig M., Popovic I. G.; Diesner K.,; Chemseddine; Eychmuller A.; Weller H.; J. Phys. Chem. (1994) 98, 7665–7673.
(12) Murray C. B.; Norris D. J.; Bawendi M. G.; J. Am.Chem. Soc. (1993) 115, 8706–8715.
(13) Rogach A. L.; Katsikas L.; Kornowski A.; Su D.; Eychmuller A.; Weller H.; Ber. Busenges. Phys. Chem. (1996), 100, 1772–1778.
(14) Mahamuni S.; Khosravi A. A.; Kundu M.; Kshirsagar A.; Bedekar A.; Avasare D. B.; Singh P.; Kulkarni S. K.; J. Appl. Phys. (1993), 73(10), 5237–5240.
(15) Rosetti R., Hull R., Gibson J. M., Brus L. E. ; J. Phys. Chem. (1985), 82, 552–559.

OBJECTS OF THE INVENTION

It is an object of the present invention to provide a process for the preparation of metal chalcogenide nanoparticle dispersions which can be washed and concentrated without the occurence of excessive agglomeration.

It is a further object of the present invention to provide a process for the preparation of doped metal chalcogenide particles which can be used in an electroluminescent device.

SUMMARY OF THE INVENTION

The above mentioned objects are realised by providing a process for the preparation of a nanoparticle dispersion of an optionally doped metal chalcogenide, comprising the steps of
(a) performing a precipitation by mixing together appropriate aqueous solutions of metal cations, of chalcogenide anions, and optionally of a salt of the dopant respectively, thus forming a predispersion,
(b) performing a diafiltration and/or ultrafiltration washing step on said predispersion, characterized in that said step is performed in the presence of a compound capable of preventing agglomeration of the nanoparticles of the dispersion.

In a preferred embodiment the compound capable of preventing agglomeration is chosen from glycerol, thioglycerol, polyphosphoric acid, a polyphosphate and a hexametaphosphate.

When the metal chalcogenide is doped, e.g. doped ZnS, it can be used in the construction of an electroluminescent device.

DETAILED DESCRIPTION OF THE INVENTION

The present invention will now further explained on the hand of a preferred embodiment wherein the metal chalcogenide is zinc sulfide doped with manganese ions.

Such a ZnS:Mn nanoparticle dispersion is prepared by a precipitation reaction performed by mixing appropriate aqueous solutions of the respective ions. Preferably, the precipitation reaction is performed according to the double jet principle whereby a first and a second solution are added simultaneously to a third solution under controlled conditions of flow rate. For instance, the first solution contains zinc ions, e.g. zinc acetate, and manganese ions, e.g manganese acetate ions. The second solution contains sulfide ions, e.g. sodium sulfide ions. These two solutions are added together to a third aqueous solution. This third solution may also contain a small amount of zinc ions, e.g. zinc acetate.

The resulting nanoparticle predispersion has to be washed and concentrated. In the practice of the present invention this is performed by a diafiltration and/or ultrafiltration treatment. It is the essence of the present invention that this diafiltration and or ultrafiltration step is performed in the presence of a compound capable of preventing agglomeration of nanoparticles. The nature of this compound is not restricted to a particular chemical class but can be chosen from various chemical types. Preferred compounds are polyphosphoric acid, a polyphosphate such as sodium polyphosphate, a hexametaphosphate such as sodium hexametaphosphate, glycerol and thioglycerol. The most interesting compounds are the phosphates because they are odourless. The compound is preferably added partly to the predispersion after precipitation and before diafiltration, and partly in the diafiltration liquid.

The present invention has been explained on the hand of a ZnS dispersion doped with Mn but it will readily be understood that it extends to other dopants and other metal chalcogenides, doped or not. For instance, zinc sulfide can be without dopant, or can be doped with other luminescent centres such as Cu, Ag, Tb, Eu, Ag, etc. Furtheron, the scope of the invention extends to e.g. ZnSe, CdS, and CdSe, each of which can be doped or not.

When the metal chalcogenide dispersion is doped and therefore capable of luminescence it can be used in the form of a coated layer in the construction of an electroluminescent device, more particularly in a so-called Thin Film Inorganic Light Emitting Diode. In such a device the luminescent layer, e.g comprising Zns:Mn dispersion is inserted between two conductive electrodes, of which at least one is transparent.

The first conductive layer is preferably an ITO (Indium Tin Oxide) electrode. An ORGACON conductive foil (trade name of Agfa-Gevaert N.V.) can also be used. Thin transparent electrodes of evaporated Ag, Au, . . . can also be used. The transparent electrode is preferably applied on top of a plastic substrate, e.g. a polyester substrate such as a polyethylene terephthalate substrate, but a glass substrate can also be used. In case the top-electrode (second electrode) is transparent, a non-transparent electrode on glass or plastic can also be used (e.g. Al, Ca, Ag, Mg, Au, etc.) as first electrode.

The coating composition, comprising the doped metal chalcogenide dispersion and optionally a surfactant and/or a binder, can be applied on top of the first conductive electrode by any suitable coating technique. For the manufacturing of a small prototype spincoating is mostly preferred, but for larger areas doctor blade coating or continuous coating techniques such as used in photographic emulsion coating like air knife coating or curtain coating can be used. The obtained thickness of the dispersion layer(s) is dependent from the nature and concentration of the binder, and from the coating conditions. This thickness is preferably between 50 and 1000 nm.

Finally, a second conductive electrode is applied on top of the coated layer. At least one of the two conductive electrodes must be transparent. In a preferred embodiment the second conductive electrode is an aluminum electrode (cathode) applied by vacuum deposition. Also Ca, Mg, LiF/Al, Ag can be used. In case the bottom electrode used is non-transparent (Al, Ag, . . . ) a transparent electrode should be applied on top of the spincoated doped ZnS layer. This can be done e.g. by spincoating a dispersion comprising a poly(3,4,-ethylenedioxythiophene/polystyrene sulphonate (PEDOT/PSS) complex, or by sputtering an ITO layer on top of it, or by evaporation of a thin and transparent conductive metallic layer like Al, Ag, Au, . . . .

The present invention will now be illustrated by the following examples without however being limited thereto.

EXAMPLES

Example 1

The following solutions were prepared:

| Solution 1 | |
| --- | --- |
| $Zn(AC)_2.2H_2O$ | 471.4 g |
| $Mn(AC)_2.4H_2O$ | 10 g |
| DW | to 1500 ml |
| Solution 2 | |
| $Na_2S.9H_2O$ | 381.8 g |
| NaOH (50%) | 7.7 ml (50%) |
| DW | to 1500 ml |
| Solution 3 | |
| $Zn(AC)_2.2H_2O$ | 11.2 g |
| DW | to 1500 ml |

The Zn(Mn)S dispersion was prepared as follows:

To solution 3, held at 50° C. and stirred at 450 rpm, solutions 1 and 2 were added simultaneously at room temperature both at a flow rate of 500 ml/min. This precipitation reaction gave rise to the predispersion A, comprising luminescent Zn(Mn)S-particles (emission band at 590 nm).

After the precipitation, the predispersion A was divided in two equal parts.

To one part 125 ml water was added (comparison) and this dispersion was diafiltrated through a Fresenius F60 cartridge by using pure water as washing solution. Due to the sudden pressure raise after a minute or so, this dispersion could not be diafiltred any further.

To the other part of the predispersion A, 125 ml of thioglycerol was added (invention) and this dispersion was diafiltrated through a Fresenius F60 cartridge by using a 5% solution of thioglycerol in water. This dispersion was washed successfully until a conductivity of 0.5 mS/cm was obtained. After the washing, this dispersion was succesfully concentrated by means of the diafiltration set-up to a maximum concentration of about 100 g ZnS/l without any visual form of agglomeration.

The dispersions were analysed for their particle size distribution (weight average $d_{wa}$) with the Disc Centrifuge Photosedimentometer BROOKHAVEN BI-DCP. The results are shown in table 1.

| Sample | Thioglycerol Added after Precipitation | Washing solution | Ultrafiltration | DCP |
|---|---|---|---|---|
| Comparison | No | Water | Not possible | — |
| Invention | Yes | 5% thioglycerol in water | Possible | 108 nm |

Although particle sizes could be measured with DCP, no clear particles could be visualized by Electron Microscopy (SEM, TEM). The measured particle sizes are probably due (as revealed by EM images) to aggregates of nano-sized particles. This is further confirmed by the fact that ultrasonic treatment before the DCP measurement clearly influences the obtained particle size distribution. The longer the time between the ultrasonic treatment and the DCP-measurement, the larger the obtained values for the weigth average particle size. Also the polydispersity increases.

XRD-measurements indicate low crystalline ZnS, however the obtained diffraction signal was used in the Debye-Scherrer equation to calculate the crystalline particle size. Depending on the precipitation conditions, particle sizes between 1.5 and 5 nm were found.

Another indication that the primary particles are indeed much smaller as revealed by DCP-measurements, is the fact that the absorption edge of the ZnS-dispersion and/or layer shifts to shorter wavelengths if compared with bulk ZnS (~330 nm). This is a well known phenomenon in quantum dots[2]. Depending on the precipitation conditions, values of the absorption edge for the ZnS disperions or layers between 275 and 310 nm were found, indicating, according to the Brus equation[15], particle sizes between 1.5 and 5 nm.

Although that the DCP technique does not give information about particles smaller then 10–20 nm in case of real nano-particle dispersions the technique gives important information about the largest aggregates present in the dispersion. By applying layer thicknesses by means of spincoating of about 200–400 nm, it is important that the weight average particle size diameter as found by DCP after ultrasound treatment, which is also used before spincoating, stays below 150 nm and more prefarably below 100 nm in order to obtain smooth layers.

Example 2

To 1000 ml of the same predispersion A from example 1, 1000 ml of a 2% solution of sodium hexametaphosphate in water/ethanol (98.5/1.5) was added and this dispersion was diafiltrated through a Fresenius F60 cartridge by using a 2% solution of sodium hexametaphosphate in water/ethanol (98.5/1.5). This dispersion was washed successfully until a conductivity of 8 mS/cm was reached.

After the washing, this dispersion was concentrated by means of the same diafiltration set-up to a concentration of about 75 g ZnS/l.

The finished dispersion was analysed for its particle size distribution (weight average $d_{wa}$) with the Disc Centrifuge Photosedimentometer BROOKHAVEN BI-DCP. A weight average particle size diameter of 108 nm was obtained.

Example 3

To 1000 ml of the same predispersion A from example 1, 1000 ml of a 2% solution of sodium polyphosphate in water was added and this dispersion was diafiltrated through a Fresenius F60 cartridge by using a 2% solution of sodium polyphosphate in water. This dispersion was washed successfully until a conductivity of 9 mS/cm was reached.

After the washing, this dispersion was concentrated by means of the same diafiltration set-up to a concentration of about 75 g ZnS/l.

The final dispersion was analysed for its particle size distribution (weight average $d_{wa}$) with the Disc Centrifuge Photosedimentometer BROOKHAVEN BI-DCP. A weight average particle size diameter of 108 nm was obtained.

Example 4

To 1000 ml of the same predispersion A from example 1, 50 ml of glycerol added and this dispersion was diafiltrated through a Fresenius F60 cartridge by using a 5% solution of glycerol in water. This dispersion was washed successfully until a conductivity of 0.5 mS/cm was reached.

After the washing, this dispersion was concentrated by means of the same diafiltration set-up to a concentration of about 75 g ZnS/l.

The final dispersion was analysed for its particle size distribution (weight average $d_{wa}$) with the Disc Centrifuge Photosedimentometer BROOKHAVEN BI-DCP. A weight average particle size diameter of 108 nm was obtained.

What is claimed is:

1. A process for the preparation of a nanoparticle dispersion of an optionally doped metal chalcogenide, comprising the steps of
    (a) performing a precipitation by mixing together appropriate aqueous solutions of metal cations, of chalcogenide anions, and optionally of a salt of the dopant respectively, thus forming a predispersion,
    (b) performing a diafiltration and/or ultrafiltration washing step on said predispersion, wherein said step is performed in the presence of a compound capable of preventing agglomeration of the nanoparticles of the dispersion.

2. A process according to claim 1 wherein said optionally doped metal chalcogenide is chosen from the group consisting of ZnS, ZnSe CdS, CdSe, doped ZnS, doped ZnSe, doped CdS and doped CdSe.

3. A process according to claim 2 wherein said metal chalcogenide is ZnS doped with $Mn^{2+}$ or $Cu^+$ ions.

4. A process according to claim 1 wherein said precipitation step is performed according to the double jet principle whereby a first solution containing said metal ions and optionally said dopant salt, and a second solution containing said chalcogenide anions are added simultaneously to a third solution.

5. A process according to claim 1 wherein said compound preventing agglomeration of the nanoparticles of the dispersion is thioglycerol.

6. A process according to claim 1 wherein said compound preventing agglomeration of the nanoparticles of the dispersion is glycerol.

7. A process according to claim 1 wherein said compound preventing agglomeration of the nanoparticles of the dispersion is a polyphosphate or polyphosphoric acid.

8. A process for the preparation of a nanoparticle dispersion of an optionally doped metal chalcogenide, comprising the steps of
    (a) performing a precipitation by mixing together appropriate aqueous solutions of metal cations, of chalcogenide anions, and optionally of a salt of the dopant respectively, thus forming a predispersion,
    (b) performing a diafiltration and/or ultrafiltration washing step on said predispersion, characterized in that said step is performed in the presence of a compound capable of preventing agglomeration of the nanoparticles of the dispersion, wherein said compound preventing agglomeration of the nanoparticles of the dispersion is a hexametaphosphate.

9. Process according to claim 8, wherein said optionally doped metal chalcogenide is chosen from the group consisting of ZnS, ZnSe CdS, CdSe, doped ZnS, doped ZnSe, doped CdS and doped CdSe.

10. Process according to claim 9, wherein said metal chalcogenide is ZnS doped with $Mn^{2+}$ or $Cu^+$ ions.

11. Process according to claim 8, wherein said precipitation step is performed according to the double jet principle whereby a first solution containing said metal ions and optionally said dopant salt, and a second solution containing said chalcogenide anions are added simultaneously to a third solution.

12. A process for the preparation of a nanoparticle dispersion of an optionally doped metal chalcogenide, comprising the steps of:
  (a) performing a precipitation by mixing together appropriate aqueous solutions of metal cations, of chalcogenide anions, and optionally of a salt of the dopant respectively, thus forming a predispersion,
  (b) adding a compound capable of preventing agglomeration of the nanoparticles of the dispersion to said predispersion;
  c) performing a diafiltration and/or ultrafiltration washing step on said predispersion in the presence of said compound.

13. Process according to claim 12, wherein said optionally doped metal chalcogenide is chosen from the group consisting of ZnS, ZnSe CdS, CdSe, doped ZnS, doped ZnSe, doped CdS and doped CdSe.

14. Process according to claim 13, wherein said metal chalcogenide is ZnS doped with $Mn^{2+}$ or $Cu^+$ ions.

15. Process according to claim 12, wherein said precipitation step is performed according to the double jet principle whereby a first solution containing said metal ions and optionally said dopant salt, and a second solution containing said chalcogenide anions are added simultaneously to a third solution.

16. Process according to claim 12, wherein said compound preventing agglomeration of the nanoparticles of the dispersion is thioglycerol.

17. Process according to claim 12, wherein said compound preventing agglomeration of the nanoparticles of the dispersion is glycerol.

18. Process according to claim 12, wherein said compound preventing agglomeration of the nanoparticles of the dispersion is a polyphosphate or polyphosphoric acid.

19. A process for the preparation of a nanoparticle dispersion of an optionally doped metal chalcogenide, comprising the steps of
  (a) performing a precipitation by mixing together appropriate aqueous solutions of metal cations, of chalcogenide anions, and optionally of a salt of the dopant respectively, thus forming a predispersion,
  (b) performing a diafiltration and/or ultrafiltration washing step on said predispersion, characterized in that said step is performed in the presence of a compound capable of preventing agglomeration of the nanoparticles of the dispersion, wherein said compound preventing agglomeration of the nanoparticles of the dispersion is glycerol.

20. Process according to claim 19, wherein said optionally doped metal chalcogenide is chosen from the group consisting of ZnS, ZnSe CdS, CdSe, doped ZnS, doped ZnSe, doped CdS and doped CdSe.

21. Process according to claim 20, wherein said metal chalcogenide is ZnS doped with $Mn^{2+}$ or $Cu^+$ ions.

22. Process according to claim 19, wherein said precipitation step is performed according to the double jet principle whereby a first solution containing said metal ions and optionally said dopant salt, and a second solution containing said chalcogenide anions are added simultaneously to a third solution.

23. A process for the preparation of a nanoparticle dispersion of an optionally doped metal chalcogenide, comprising the steps of
  (a) performing a precipitation by mixing together appropriate aqueous solutions of metal cations, of chalcogenide anions, and optionally of a salt of the dopant respectively, thus forming a predispersion,
  (b) performing a diafiltration and/or ultrafiltration washing step on said predispersion, characterized in that said step is performed in the presence of a compound capable of preventing agglomeration of the nanoparticles of the dispersion, wherein said compound preventing agglomeration of the nanoparticles of the dispersion is a polyphosphate or polyphosphoric acid.

24. Process according to claim 23, wherein said optionally doped metal chalcogenide is chosen from the group consisting of ZnS, ZnSe CdS, CdSe, doped ZnS, doped ZnSe, doped CdS and doped CdSe.

25. Process according to claim 24, wherein said metal chalcogenide is ZnS doped with $Mn^{2+}$ or $Cu^+$ ions.

26. Process according to claim 23, wherein said precipitation step is performed according to the double jet principle whereby a first solution containing said metal ions and optionally said dopant salt, and a second solution containing said chalcogenide anions are added simultaneously to a third solution.

* * * * *